United States Patent
Baumann et al.

(10) Patent No.: US 8,038,296 B2
(45) Date of Patent: Oct. 18, 2011

(54) OPTICAL OBSERVATION INSTRUMENT AND A METHOD OF CONTROLLABLY ADJUSTING A REFRACTIVE POWER IN SUCH INSTRUMENT

(75) Inventors: Oliver Baumann, Lüneburg (DE); Jesús Miguel Cabeza Guillén, Aalen (DE); Michael Claus, Aalen (DE); Markus Haidl, Aalen (DE); Gerhard Kelch, Aalen (DE); Timo Kratzer, Aalen (DE); Herbert Krug, Aalen (DE); Peter Schnitzer, Heidenheim (DE); Hexin Wang, Koenigsbronn (DE)

(73) Assignee: Carl Zeiss Vision GmbH, Aalen (DE)

( * ) Notice: Subject to any disclaimer, the term of this patent is extended or adjusted under 35 U.S.C. 154(b) by 0 days.

(21) Appl. No.: 12/048,788

(22) Filed: Mar. 14, 2008

(65) Prior Publication Data

US 2008/0212025 A1 Sep. 4, 2008

Related U.S. Application Data

(63) Continuation of application No. PCT/EP2006/009205, filed on Sep. 22, 2006.

(30) Foreign Application Priority Data

Sep. 29, 2005 (DE) .......................... 10 2005 048 212

(51) Int. Cl.
*A61B 3/10* (2006.01)
*G02C 7/06* (2006.01)

(52) U.S. Cl. ........................................ 351/205; 351/168
(58) Field of Classification Search .................. 351/200, 351/205, 210, 41, 159, 168, 7
See application file for complete search history.

(56) References Cited

U.S. PATENT DOCUMENTS

| 4,181,408 A | 1/1980 | Senders |
| 4,300,818 A | 11/1981 | Schachar |
| 5,182,585 A | 1/1993 | Stoner |

(Continued)

FOREIGN PATENT DOCUMENTS

DE 102 39 689 A1 3/2004

(Continued)

OTHER PUBLICATIONS

Y.K. Nio et al; Spherical and irregular aberrations are important for the optimal performance of the human eye; 2002; pp. 103-112.

*Primary Examiner* — Dawayne Pinkney
(74) *Attorney, Agent, or Firm* — Harness, Dickey & Pierce, P.L.C.

(57) ABSTRACT

An optical observation instrument, in particular a spectacle, a reading aid or a telescope, comprises an optical element, in particular a spectacle lens, adapted to be controllably adjustable in its refractive power, a sensor, and a control unit for adjusting the refractive power as a function of signals from the sensor. The sensor is a brightness sensor. In a method of controllably adjusting a refractive power of an optical element in an optical observation instrument an optical parameter is captured by means of a sensor and the refractive power is adjusted as a function of a signal from the sensor. By means of the sensor the brightness of the light impinging on the optical instrument is captured.

16 Claims, 1 Drawing Sheet

U.S. PATENT DOCUMENTS

| | | | |
|---|---|---|---|
| 5,712,721 A * | 1/1998 | Large | 359/245 |
| 6,244,703 B1 | 6/2001 | Resnikoff et al. | |
| 6,491,394 B1 | 12/2002 | Blum et al. | |
| 7,131,725 B2 | 11/2006 | Walh et al. | |
| 7,486,988 B2 * | 2/2009 | Goodall et al. | 600/546 |
| 7,588,332 B2 * | 9/2009 | Blum et al. | 351/159 |
| 2006/0012747 A1 | 1/2006 | Wahl et al. | |

FOREIGN PATENT DOCUMENTS

| | | |
|---|---|---|
| DE | 102 58 729 A1 | 7/2004 |
| EP | 0 341 519 | 11/1989 |
| FR | 2 530 039 | 1/1984 |
| WO | WO 02/065197 | 8/2002 |
| WO | WO 2005/057252 | 6/2005 |

\* cited by examiner

OPTICAL OBSERVATION INSTRUMENT AND A METHOD OF CONTROLLABLY ADJUSTING A REFRACTIVE POWER IN SUCH INSTRUMENT

CROSS REFERENCE TO OTHER APPLICATIONS

The present application is a continuation of pending International patent application PCT/EP2006/009205, filed Sep. 22, 2006 which designates the United States and was published in German, and which claims priority of German patent application 10 2005 048 212.0, filed Sep. 29, 2005. The disclosure of the above application is incorporated herein by reference.

FIELD OF THE INVENTION

The invention is related to the field of optical instruments.

More specifically, the invention is related to spectacles, telescopes, viewing aids and the like.

Still more specifically, the invention is related to an optical observation instrument comprising an optical element adapted to be controllably adjustable in its refractive power, a sensor, and a control unit for adjusting the refractive power as a function of signals from the sensor.

Likewise, the invention, further, is related to a method of controllably adjusting a refractive power of an optical element in an optical observation instrument, in which by means of a sensor an optical parameter is captured and the refractive power is adjusted as a function of a signal from the sensor.

BACKGROUND OF THE INVENTION

For the dynamic correction of viewing defects it is known to use spectacles having spectacle lenses which may be adjusted electronically in their refractive power. In U.S. patent application publication 2006/0012747 A1 there is described an auto-focusing spectacle in which a sensor is located on the spectacle frame which measures the refractive power of at least one eye directly. The output signal from the sensor is transmitted to a control unit which adjusts the refractive power of the spectacle lens associated to the measured eye accordingly. By doing so, also persons having a limited ability of accommodating are enabled to view sharply over a wide range of distances.

A similar apparatus is also described in U.S. Pat. No. 6,491,394 B1. The electronically controlled spectacle disclosed therein also dynamically corrects viewing defects of the spectacle user. These defects comprise defects of lower order (short sightedness, long sightedness, astigmatism), but also viewing defects of higher order (aberrations and further viewing defects of higher order). In these prior art spectacles one has, further, provided for adjusting the refractive power in limited areas thereof.

U.S. Pat. No. 4,300,818 discloses an auto-focusing spectacle. On the rear side of the spectacle frame nose piece there are provided two light sources and two light detectors in a position and orientation being specific for the particular user of the spectacle. Due to their particular orientation, the light sources each emit a light beam directed onto the bright sclera of the right eye and on the dark cornea of the left eye, respectively, when the user looks at a far away object. The light detectors receive the reflected beams. If the user now looks at a nearby object, the so called convergence angle appears, i.e. the axes of the eyes which extended in parallel for a far away object now intersect for a nearby object with the convergence angle increasing as the object distance decreases. As a result, the emitted light beams no longer impinge on the illuminated bright and dark areas within the eyes but on areas of opposite reflectivity. Accordingly, the convergence angle may be determined.

For viewing defects of higher order, various influences are of importance. For example, one has found out that the illumination intensity, i.e. the brightness of the light impinging into the optical observation instrument and, hence, on the eyes of the user, plays a significant role. This is because the pupils of the user adapt as a function of the illumination intensity, in that the pupils are smaller under bright ambient conditions and are wider within darkness, as is generally known. This variation in pupil diameter substantially affects the viewing defects of higher order.

On the one hand, the viewing defects of second order (defocus and astigmatism) vary together with the pupil size. This is because the cornea does not have a spherical surface but only an essential toric surface. Therefore, for different pupil diameters, the cornea surface used is different. For irregular cornea surfaces, this results in a variation of the effective main cornea curvature. This alters the total refractive power of the eye. For some people, therefore, the refractive power of their eyes is higher at night.

On the other hand the viewing defects of higher order vary with pupil size. Even if the cornea had an ideal spherical surface, a variation of pupil diameter would cause a variation of the spherical aberration of the eye. Further, also the irregular cornea surface plays a role also in this context. For different pupil diameters the effect of irregularities is different. This results a change of higher order aberrations.

It is, therefore, an object underlying the invention to improve an optical observation instrument, in particular a spectacle, as well as method of the type specified at the outset, such that the afore-mentioned disadvantages are avoided. In particular, the invention shall make it possible to perfect the correction of viewing defects of second and higher order by further taking into account additional influences.

In an optical observation instrument of the type specified at the outset, this object is achieved according to the invention in that the sensor is a brightness sensor.

SUMMARY OF THE INVENTION

In a method specified at the outset, this object is achieved according to the invention in that by means of the sensor the brightness of the light impinging on the optical instrument is captured. In particular, the brightness sensor captures an intensity of an illumination by ambient light falling into the eyes of a user of said optical instrument.

The object underlying the invention is, thus, entirely solved.

By taking into account the illumination intensity, the effects discussed at the outset and relating to viewing defects of second and higher order, namely the influence of the varying pupil diameter in connection with the non-spherical shape of the cornea may be substantially compensated for.

From European patent application publication 0 341 519 A2 as well as from French patent specification 2 530 039 A1 spectacles having an integrated brightness sensor are known, however, these sensors control the transparence of the spectacle lenses in order to thereby configure electronic sunglasses or protective work spectacles.

According to a first variation of the observation instrument according to the invention, the brightness is captured directly.

This measure has the advantage that simple and reliable brightness sensors, for example photo diodes, may be used.

According to a second variation, however, the brightness is captured indirectly, preferably in that the diameter of the pupil of an eye of a user of the observation instrument is measured.

This measure has the advantage that additionally the behavior of the iris during altering ambient brightness conditions is taken into account.

In a preferred embodiment of the invention, the optical element is adapted to be adjusted in its refractive power in selected areas thereof.

This measure, on the one hand, has the advantage that the correction of viewing defects of higher order is effectively possible because by adjusting the various areas of a spectacle lens, for example, differently, one can generate almost any conceivable aspheric shape. On the other hand, one can effect an adaptation to the conditions of normal use in that, for example, the lower area of a spectacle lens is optimized for the near range and the upper area for a distant range, or by taking into account the direction of viewing of the user.

In the simplest case the optical observation instrument may exclusively be controlled by the brightness sensor, in that, for example, only the sphere is adapted as a function of the condition bright/dark.

In a particularly preferred embodiment of the invention, however, means are provided for measuring the refractive power of at least one eye of a user of the optical observation instrument, wherein output signals from the means are fed to the control unit and the signals from the sensor are superimposed on the output signals from the means.

This measure has the advantage that the adjustment of the refractive power of the optical element, for example the spectacle lens, is configured as a superimposed control, in which the basic control takes place via a measurement of the refractive power of at least one eye of the user, and the illumination intensity is used as a correction value.

In the last mentioned case, the means for measuring the refractive power simultaneously capture the diameter of the at least one pupil.

The adjustment of the refractive power, in an alternative, may be effected only within small ranges, as may be sufficient for a specific person. Moreover, the adjustment may also take place over a wide range, so that the optical observation instrument may be used by several persons.

Preferably, the optical observation instrument may be configured as a spectacle having at least one lens adapted to be controllably adjusted in its refractive power, or as a reading lens having a lens adapted to be controllably adjusted in its refractive power, or as a telescope having a lens adapted to be controllably adjusted in its refractive power.

In a first group of embodiments, the lens may be adapted to be adjusted electrically, for example by means of alternating electrical, magnetic or electromagnetic fields or by quasi-static electrical, magnetic or electromagnetic fields.

In a second group of embodiments, in contrast, the lens may be adapted to be adjusted by means of mechanical, hydraulic or pneumatic power action.

Further advantages will become apparent from the description and the enclosed drawing.

It goes without saying that the afore-mentioned features and those that will be discussed hereinafter may not only be used in the particularly given combination, but also in other combinations, or alone, without leaving the scope of the present invention.

BRIEF DESCRIPTION OF THE DRAWINGS

Embodiments of the invention are shown in the drawing and will be discussed in further detail throughout the subsequent description.

DETAILED DESCRIPTION OF THE PREFERRED EMBODIMENT

Figure 1:
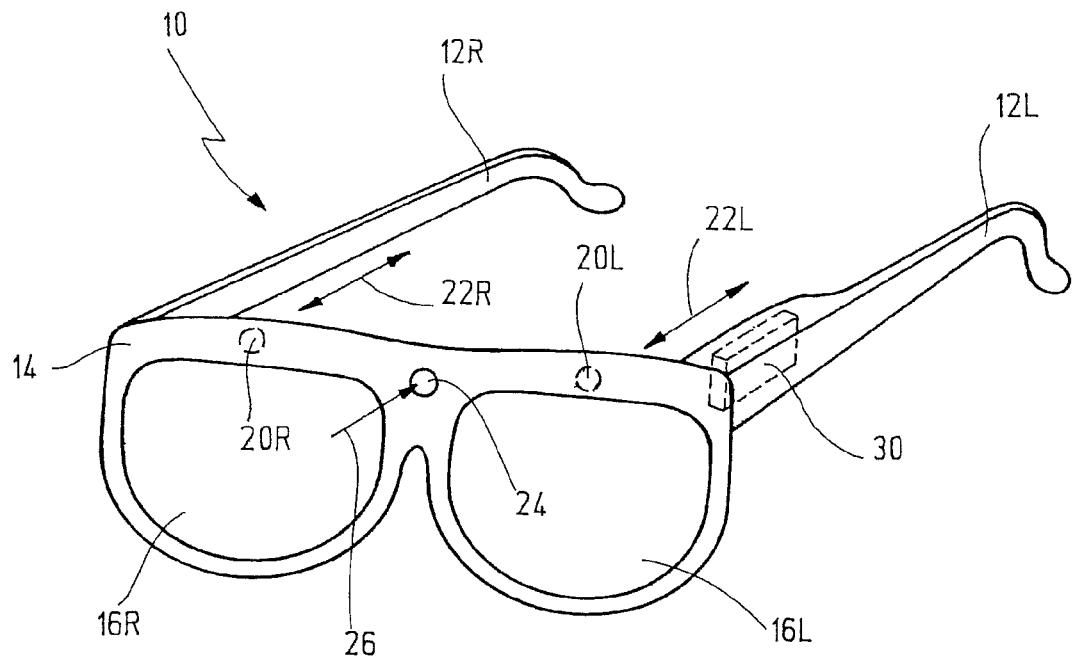
FIG. 1 shows an extremely schematic prospective view of an embodiment of an optical observation instrument configured as a spectacle, according to the invention.

In FIG. 1 reference numeral 10 as a whole designates a spectacle which is discussed here just as an example of an optical observation instrument which may also be a viewing aid, a lens, a telescope or the like, i.e. an instrument that may be used by a person observing with his/her eyes an object by means of optical aiding means.

Spectacle 10 is provided with side pieces 12R and 12L, which are held together by a front frame 14. Frame 14 holds spectacle glasses or lenses 16R and 16L. At least one of the spectacle lenses 16R and 16L is adapted to be controllably adjusted in its refractive power, be it as a whole or within predetermined areas, as is known per se.

Spectacle lenses 16R and 16L, for that purpose, may be configured from liquid crystals, for example as pixeled SLM (spatial light modulator) or as a lens adapted to be focused under the control of a field. The field may be electric, magnetic or electromagnetic. It may be an alternating field or a quasi-static field. The control, however, may also be mechanic, hydraulic or pneumatic.

On the rear side of frame 14, i.e. directed towards the eyes of the user (not shown) of spectacle 10, there are provided transmitter and receiver modules 20R and 20L above spectacle lenses 16R and 16L. Modules 20R and 20L are used for preferably directly measuring the refractive power of the eyes of the user, as is described in detail in U.S. patent application publication 2006/0012747 A1. The corresponding light beams, i.e. the measuring light directed into the eyes as well as the light reflected from the eyes are indicated at 22R and 22L.

On the front side of frame 14, preferably in the center thereof, there is provided a brightness sensor 24. Brightness sensor 24 measures the illumination intensity of the ambient light impinging on the eyes of the user, indicated with an arrow 26. It goes without saying that also a plurality of such brightness sensors may be provided, for example one for each eye.

As an alternative to this direct measurement, the brightness may likewise be measured indirectly, for example by measuring the diameter of the pupil of at least one eye of the user. This function may be integrated into the transmitter and receiver modules 20R, 20L.

Transmitter and receiver modules 20R, 20L as well as brightness sensor 24 are coupled to a control unit 30 which, in the depicted embodiment, is integrated into left side piece 12L.

Figure 2:
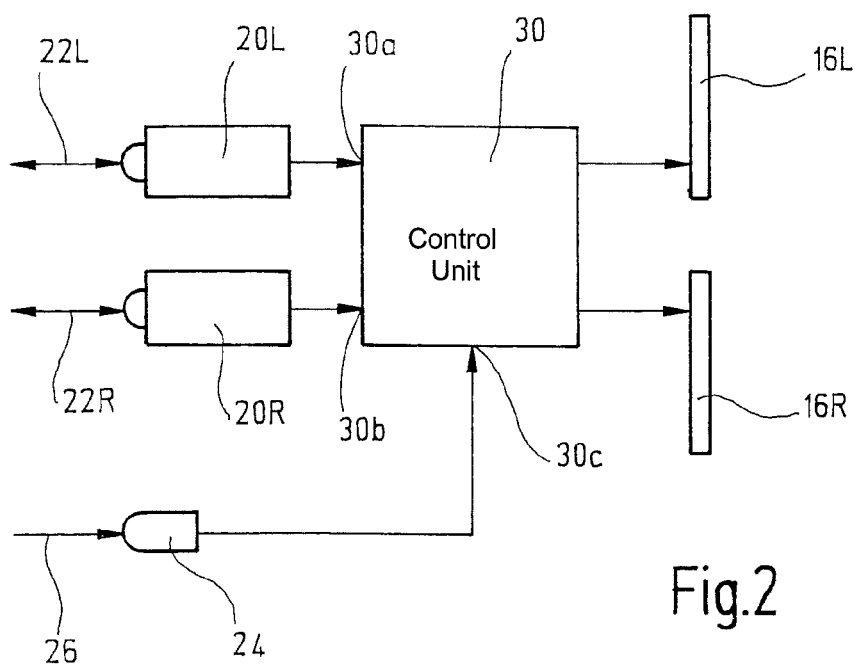
FIG. 2 shows a block diagram for explaining the operation of the spectacle of FIG. 1.

FIG. 2 shows a block diagram of the circuitry of the afore-mentioned elements. Transmitter and receiver modules 20R, 20L are coupled to inputs 30A and 30B of control unit 30. From the signals of transmitter and receiver modules 20R, 20L control unit 30 generates control signals for adjusting the refractive power of spectacle lenses 16R and 16L. This control is, preferably, superimposed by the signal of brightness sensor 24 coupled to another input 30C of control unit 30.

In a simple embodiment, spectacle 10 may only be provided with a brightness sensor 24, i.e. without elements for determining the refractive power of the eyes of the user. Then, the refractive power of spectacle lenses would only be adjusted as a function of the ambient conditions bright/dark, irrespective of the individual viewing defects of the user.

In that case the range of adjustment may be set within wide limits because the spectacle or another optical observation instrument could then be used by several persons (family spectacle).

The invention claimed is:

1. A spectacle having at least one lens adapted to be controllably adjustable in its refractive power, said spectacle comprising a first sensor, and a control unit for dynamically adjusting said refractive power as a function of the magnitude of the signals from said first sensor, wherein said first sensor is a brightness sensor for detecting an intensity of the ambient light to which the eyes of a user of said spectacle are exposed, and further comprising a second sensor device for measuring the refractive power of at least one eye of a user of said spectacle and producing corresponding output signals that are supplied to said control unit, such that said control unit dynamically adjusts the refractive power of said lens as a function of both said signals from said first sensor and said output signals from said second sensor device.

2. The spectacle of claim 1, wherein said brightness sensor senses the brightness of the ambient light directly.

3. The spectacle of claim 1, wherein said brightness sensor senses the brightness of the ambient light indirectly.

4. The spectacle of claim 3, wherein said brightness sensor senses the brightness of the ambient light via a measurement of a diameter of a pupil of at least one eye of a user of said spectacle.

5. The spectacle of claim 1, wherein said lens is adapted to be adjusted in its refractive power in selected areas thereof.

6. The spectacle of claim 1, wherein said brightness sensor senses the brightness of the ambient light via a measurement of a diameter of a pupil of at least one eye of a user of said spectacle.

7. The spectacle of claim 1, wherein said lens is adapted to be adjusted electrically.

8. The spectacle of claim 7, wherein said lens is adapted to be adjusted by means of alternating electrical, magnetic or electromagnetic fields.

9. The spectacle of claim 7, wherein said lens is adapted to be adjusted by means of quasi-static electrical, magnetic or electromagnetic fields.

10. The spectacle of claim 1, wherein said lens is adapted to be adjusted by means of mechanical, hydraulic or pneumatic power action.

11. The spectacle of claim 2, wherein the spectacle has a first side confronting the eyes of the user and a second side opposite said first side, and further wherein said brightness sensor is mounted on said spectacle so as to directly receive the ambient light impinging on said second side of the spectacle.

12. A spectacle having at least one lens that is adapted to be worn by a user so that the lens is spaced from and confronts an eye of the user, the lens being controllably adjustable in its refractive power, said spectacle comprising a first sensor oriented away from the eyes of the user so as to directly receive the ambient light to which the eyes of the user are exposed, a second sensor for measuring the refractive power of at least one eye of the user and producing a corresponding second output signal, and a control unit for dynamically adjusting said refractive power as a function of said second output signal and the magnitude of a first output signal from said first sensor, wherein said first sensor is a brightness sensor for detecting an intensity of the ambient light to which the eyes of the user are exposed and producing said first output signal the magnitude of which varies in accordance with the intensity level of the ambient light.

13. A method of controllably adjusting a refractive power of at least one lens in a spectacle, comprising the steps of:
    detecting by means of a brightness sensor mounted on said spectacle an intensity of the ambient light to which the eyes of a user of said spectacle are exposed,
    measuring by means of a second sensor the refractive power of at least one eye of a user of said spectacle and producing a corresponding output signal, and
    dynamically adjusting the refractive power of said lens as a function of both the magnitude of a signal from said brightness sensor and said output signal,
    measuring the refractive power of at least one eye of a user of said spectacle and producing a corresponding output signal, and
    dynamically adjusting the refractive power of said lens as a function of both the magnitude of a signal from said sensor and said output signal.

14. The method of claim 13, wherein the brightness of the ambient light is sensed directly.

15. The method of claim 13, wherein the brightness of the ambient light is sensed indirectly.

16. The method of claim 15, wherein the brightness of the ambient light is sensed via a measurement of a diameter of at least one pupil of an eye of a user of said spectacle.

* * * * *